United States Patent [19]
Schneider

[11] Patent Number: 5,353,915
[45] Date of Patent: Oct. 11, 1994

[54] METHOD AND APPARATUS FOR CONVERTING A MULTIPLE ROW STREAM OF CONTAINERS INTO A SINGLE FILE STREAM

[75] Inventor: Egon Schneider, Neutraubling, Fed. Rep. of Germany

[73] Assignee: Krones AG Hermann Kronseder Maschinenfabrik, Neutraubling, Fed. Rep. of Germany

[21] Appl. No.: 73,888

[22] Filed: Jun. 9, 1993

[30] Foreign Application Priority Data

Jun. 13, 1992 [DE]  Fed. Rep. of Germany ....... 4219506
Sep. 24, 1992 [DE]  Fed. Rep. of Germany ....... 4231993

[51] Int. Cl.$^5$ .............................................. B65G 47/12
[52] U.S. Cl. ..................................... 198/447; 198/453
[58] Field of Search ................ 198/419.1, 418.6, 431, 198/432, 433, 445, 452, 447, 448

[56] References Cited

U.S. PATENT DOCUMENTS 4,142,636  3/1979  Planke ........................... 198/452 X
4,669,604  6/1987  Lenhart ......................... 198/433 X
5,170,879  1/1992  Smith ............................... 198/452

FOREIGN PATENT DOCUMENTS 2743885  4/1979  Fed. Rep. of Germany ...... 198/452

Primary Examiner—Cheryl L. Gastineau
Attorney, Agent, or Firm—Ryan, Kees & Hohenfeldt

[57] ABSTRACT

A plurality of parallel infeed conveyor belts increase in length from the shortest to the longest in length increments corresponding to the length of groups of equal numbers of containers in rows on the belts. The groups are in multiple file arrangement initially and are translated respectively to the end of each belt to effect disposing the groups in series and offset but parallel relationship. The groups are then advanced together to aligned belts of an intermediate conveyor to arrive at a conversion region wherein all groups that are offset relative to a group on one intermediate conveyor belt are shifted laterally to alignment with the one group so the formerly parallel groups become arranged in single file in condition for being conveyed further.

25 Claims, 2 Drawing Sheets

METHOD AND APPARATUS FOR CONVERTING A MULTIPLE ROW STREAM OF CONTAINERS INTO A SINGLE FILE STREAM

BACKGROUND OF THE INVENTION

The invention disclosed herein pertains to a method and apparatus for converting a multiple row stream of containers into a single file stream.

A conveyor system capable of performing a conversion of this kind is described in European Patent No. 0 175 292. In the known conveyor system, a continuously operating infeed conveyor feeds bottles in a closely packed formation to an intermediate conveyor having several parallel conveyor belts which run at increasing speeds. In a transition area between the infeed and intermediate conveyors, an inclined deadplate is mounted and slants toward to intermediate conveyor. The deadplate forms an angle of about 60° with the direction of conveyor advancement. The arrangement is suitable for converting a multiple row stream of bottles or other containers whose periphery is concentric or circular relative to the access of the containers. It makes no difference if circular bottles rotate while they are being conveyed since they present a similar surface in all directions at all times. In the known conveyor system, the so-called deadplate is used. The intermediate conveyor can continuously carry off rows of containers which stand behind each other on an incline at higher speed whereby these rows can be converted into a single file container stream with additional help of gravitational force due to the sloping of the discharge and guides.

On the other hand, when the containers are not rotationally symmetrical in cross section, the desired formation of them into a single file does not automatically originate in the area before the intermediate conveyor and the containers which are fed in by the infeed conveyor do not maintain their original alignment relative to the direction of conveyance during the process of converting from what are essentially randomly arranged groups of containers to a stream of containers in single file. An obvious disadvantage is that after conversion of the multiple row stream of containers to a single file stream additional mechanisms are required to reorient the irregularly shaped containers in a uniform manner.

SUMMARY OF THE INVENTION

A basic objective of the invention disclosed herein is to provide a method and apparatus for converting multiple row streams of containers into a single file stream wherein the process and apparatus ensure that every container in the single file of the stream is arranged in the same orientation. Bottles that are not circular nor symmetrical in cross section are often called designer glass containers or bottles to distinguish them from the more common circular bottles. In accordance with the invention, groups of containers having the same number of containers in each group are handled in such a way that a series or predetermined number of groups are arranged on parallel adjacent conveyor belts. Groups are established in a staggered manner on the adjacent conveyor belts. That is, one group arrives at a leading position on one conveyor belt. The next group is one length of a group behind the first group but is on the next adjacent conveyor belt. The third group, in this example, containing an equal number of containers is set back by the length of one group on the next adjacent conveyor so, in a sense, the three groups in this example are in series, but each group is staggered by one conveyor width starting with the leading group. The staggered groups of containers are brought to a stop in staggered condition. They are released simultaneously such that the leading group arrives at the conversion conveyor and the second and third groups arrive in sequence. The leading group, in the preferred embodiment, is the first to reach angulated deflector at the end of the conversion conveyor such that this group is deflected across the next adjacent two, in this example, of the conveyor belts onto the outfeed conveyor lane. The second group of an equal number of containers has to be deflected from its lane or conveyor belt to the outfeed conveyor belt. The third group in this example has been formed on the outfeed conveyor lane and, therefore, it does not have to shift from its lane but simply follows the other two groups in sequence on the outfeed lane.

A conversion conveyor having three lanes is described herein, but it will be understood that any practical number of lanes or conveyors in parallelism can be arranged for executing the underlying principles of the invention.

In the illustrated embodiment, the infeed conveyor accommodates three parallel rows of containers wherein there are six containers in each row so that eighteen containers are fed into the system, one after another at appropriate times as will be explained later.

Since the method, in accordance with the invention, converts a multiple row container stream into a single file container stream without the disadvantage of accumulating randomly arranged containers in a conversion area, the need for special equipment to arrange or orient all of the containers in the same direction is eliminated. Of course, when the containers are placed on the infeed conveyor when they are all in the same orientation so the apparatus maintains that orientation while the multiple stream is converted to the single file stream.

The infeed conveyor is adapted for receiving bottles which are stacked by the glass bottle manufacturer onto pallets in layers, and the bottles are taken from the pallet stack by means of, what is here called, a glass unloader and are then transported to the conveyor. In the commercial embodiment, the glass unloader is also used to deliver the bottles to the conveyor. It is equally possible to put containers onto the infeed conveyor from cardboard boxes or crates by means of an unpacking machine, not shown, which operates in synchronism with the converting conveyor system.

Although the new conveyor system can reform multiple parallel rows of non-circular designer bottles and other non-symmetrical containers in a unique matter, the new system can also be used to handle or reform containers which are rotationally symmetrical in cross section into single file.

The formation of single file container groups which are staggered and offset one group behind the other can be achieved also by means of staggered variable drive speeds of the individual belts of the infeed conveyor or by means of variable drive speeds of the conveyor lanes in the intermediate conveyor. The same result can be obtained with substantially considerably low cost insofar as control and drive mechanisms are concerned by means of a synchronous drive of all infeed conveyor lane. Here, a single motor drive is required provided the individual lanes of the infeed conveyor leading toward the intermediate conveyor are staggered in steps and the lanes are arranged in succession to the lanes of the intermediate conveyor link up properly with the infeed conveyor.

The manner in which the foregoing objectives and other features of the invention are implemented will appear in the ensuing more detailed description of a preferred embodiment of the invention which will now be set forth in reference to the drawings.

DESCRIPTION OF A PREFERRED EMBODIMENT

Figure 1:
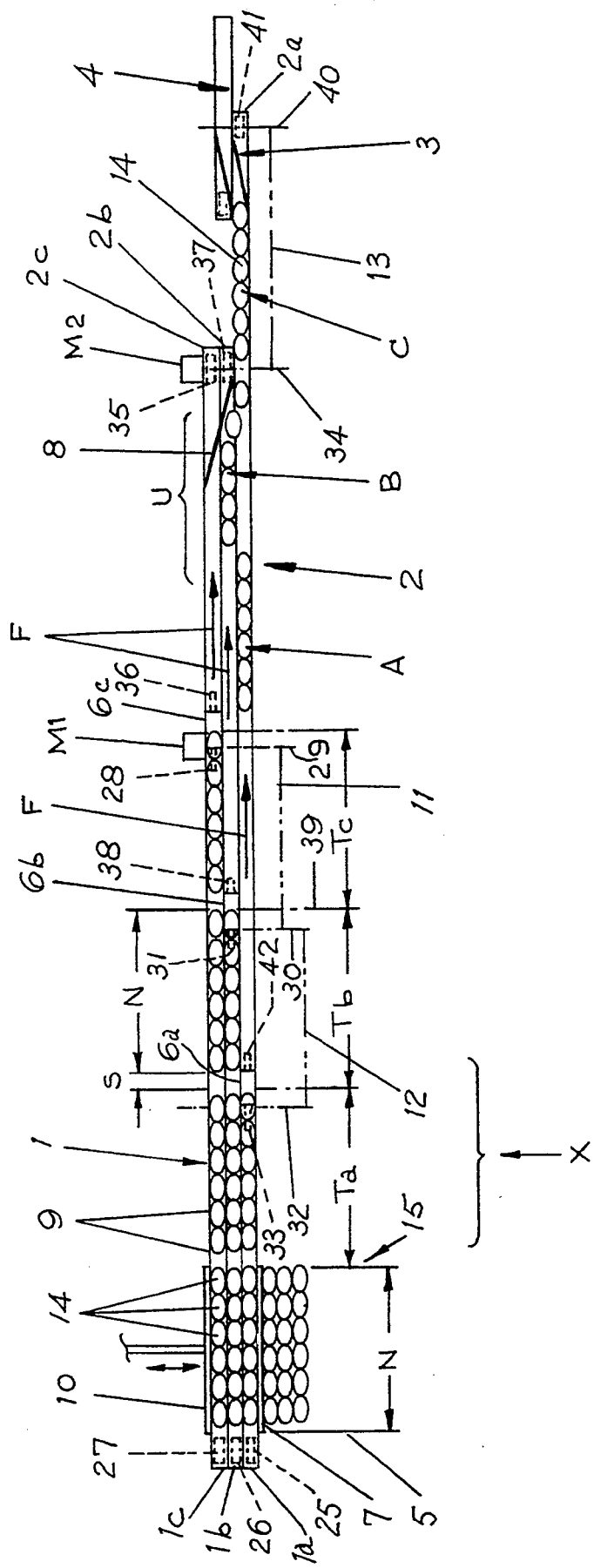
FIG. 1 is a schematic top plan view of the new conveyor system.

The infeed conveyor that is generally designated by the numeral 1 is comprised of three parallel adjacent linked plate conveyor belts 1a, 1b and 1c which lie in the same plane. For convenience, one may look upon the infeed conveyor as being the three belt sections that are to the left of drive motor M1 in FIG. 1. Conveyor belts 1a, 1b and 1c run on idler pulleys 25, 26 and 27, respectively. The drives for the individual conveyor belts 1a, 1b and 1c are represented schematically, and can take many forms. In this case, consider that motor M1 has a shaft 29 on which there is a driven pulley 28 which is turned in such direction as to translate conveyor belt 1c to the right of idler pulley 27 to driven pulley 28. The drive shaft is symbolized by a dash-dot line 29 which is coupled to a symbolically represented power transmitting member 11 such as a chain drive. The chain rotates a driven shaft represented by a dash-dot line 30. A driven pulley 31 is on this shaft. Pulley 31 is driven in a rotational direction such that conveyor belt 1b translates in the direction to the right from idler pulley 26 to driven pulley 31. Shaft 30 is coupled to a power transmitting chain member 12 which imparts rotation to a shaft 32 on which there is a pulley 33 that is driven rotationally to translate infeed conveyor belt 1a in a direction from idler pulley 25 towards driven pulley 33. Thus, it will be evident that motor M1, when energized, can drive the three conveyor belts 1a, 1b and 1c simultaneously and at the same translational speed.

At the far right of FIG. 1 there is another motor, M2, which drives the intermediate conveyor belts 2a, 2b and 2c. Motor M2 has a shaft, symbolized by the dashed line 34. A pulley 35 on shaft 34 drives intermediate conveyor belt 2c. At the remote end of conveyor belt 2c, the belt runs on a idler pulley 36. Belt 2c of the intermediate conveyor is independent of belt 1c in the infeed conveyor. It is evident on inspection that infeed conveyor belt 1c and intermediate conveyor belt 2c are in alignment with each other. Infeed conveyor belt 1b and intermediate conveyor belt 2b are independent and aligned. Another pulley 37 on the shaft of motor M2 drives intermediate conveyor belt 2b translationally. Remotely from driven pulley 37 closed loop conveyor belt 2b runs on an idler pulley 38 which is on a shaft 39. The shaft 34 of motor M2 also is coupled to a power transmitting member 13 such as a chain which drives a shaft 40 on which there is a driven pulley 41. Conveyor belt 2a is driven through the agency of pulley 41 and the remote end of the closed loop belt 2a runs on an idler pulley 42. Conveyor belt 2a serves the double purpose of participating in the conversion area U and in the outfeed area indicated by the numeral 3. All of the intermediate conveyor belts 2a, 2b and 2c are driven at the same translational speed.

Figure 2:
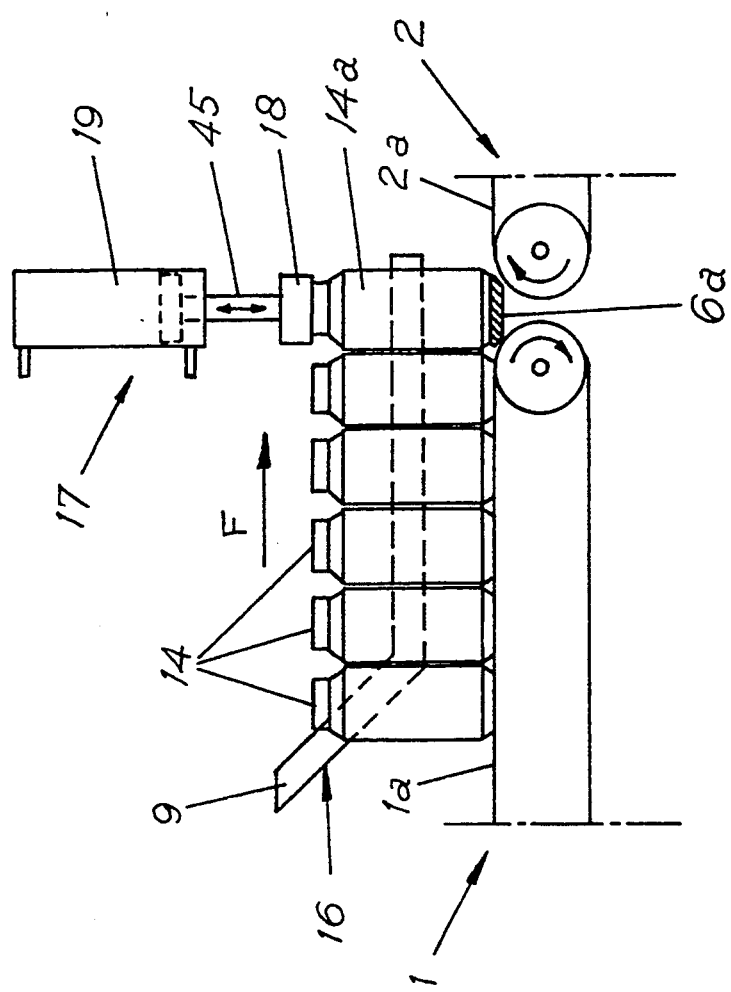
FIG. 2 is a side-elevational view of part of the intermediate conveyor of FIG. 1 where that part is viewed in the direction of the arrow leading from the letter "X".

At the place where the infeed conveyor belts become proximate to the corresponding intermediate conveyor belts there are deadplates marked 6a, 6b and 6c. FIG. 2 depicts a deadplate 6a which is typical of the other deadplates 6b and 6c. In FIG. 2, six of the containers 14 have arrived on infeed conveyor belt 1a where a transfer of the containers to intermediate belts can occur. The leading container 14a of the group of six is being held or blocked against movement temporarily by reason of blocking device 17 being activated to press the leading container against deadplate 6a. The blocking device 17 comprises a pneumatic cylinder 19 having a piston rod 45 on which there is a holding member 18. At an appropriate time as will be explained in more detail later, cylinder 19 is pressurized and piston rod is driven downwardly to apply pressure through blocking member 18 to container 14a to hold it temporarily on deadplate 6a. As a result of container 14a being held, the five containers behind it in FIG. 2 are, of course, prohibited from moving to the right until the blocking member 18 is retracted. There is a blocking device such as the one marked 17 associated with each of the other deadplates 6b and 6c, at the ends of infeed conveyor belts 1b and 1c, whose functions will be described later.

Referring to the left region of FIG. 1, one may see that three rows of oblong designer bottles are loaded on the infeed conveyor belts 1a, 1b and 1c, respectively. There are three parallel groups of bottles 14, and there are six bottles arranged in series in each group in the illustrated embodiment. The length dimension of a group of six bottles is designated by the letter N and the space between the ends of each group in each infeed conveyor line is designated with the letter S. The timing distances or conveyor stroke distances are designated Ta, Tb and Tc which correspond to the length, N, of a container row and may be looked upon as being delivered by power stroke to the infeed conveyor 1 plus one clearance distance S.

In FIG. 1, the three groups of six bottles each are transferred to the infeed conveyor lanes or belts 1a, 1b and 1c by an unloader 5 from a pallet stack, not shown. The groups are then pushed onto the infeed conveyor 1 in a direction perpendicular to the direction in which the infeed conveyor belts travel by means of a table 15. To bridge the gap between the conveyor belt of the table 15 and the conveyor belt 1a of the infeed conveyor 1, a stationary rail 7 is provided. Opposite of the container pallet unloader 5 there is a stop rail 10 that is pneumatically operated so that it can move back and forth perpendicularly to the length of the infeed conveyor 1. All of the conveyor belts of the bottle unloader 5, the infeed conveyor 1, the intermediate conveyor 2 and the discharge conveyor 3 lay in a common horizontal plane. As will be explained later, two assemblages of the eighteen bottles are deposited on the infeed conveyor belts at appropriate times in the operating sequence of the converting conveyor system are broken up in the system. The bottles are separated into staggered groups having a length about equal to the length N. Thus, the same number of containers is discharged as is supplied by the glass unloader 5 to the infeed conveyor.

A guide member 8 is arranged at an angle in respect to the longitudinal direction of the intermediate conveyor belts for deflecting the still separated groups of containers from conveyor belts 1c and 1b onto intermediate conveyor belt 2a. In this way, the groups of six bottles that are caused to be arranged in staggered relation are converted to alignment with each other on the output conveyor 3 from which they emerge in single file onto the recovery conveyor belt 4. The recovery belt 4 and conveyor belts 2a, 2b and 2c of the intermediate conveyor belt 2 are adjustable so that they can operate in proper phase relationship with a bottle filling unit, for example, not shown. During one stroke of infeed conveyor 1, conveyor belts 1a, 1b and 1c can be accelerated to the speed of the intermediate conveyor 2.

The guide surface for slanted container group deflector 8 can be implemented with a row of freely rotating rollers or with a translating belt. Another implementation for the stationary guide surface is one which can be periodically moved back and forth in a direction perpendicular to the direction of conveyance along the conveyor belts in synchronism with each infeed stroke.

By means of separator rails 9 of the rows or groups of six containers in the illustrated embodiment that stand on the infeed conveyor 1 are guided up to deadplates 6a, 6b and 6c in positive separation from each other. To facilitate entrance to the guide channels formed by the separator rails 9 for the designer glass containers 14, the infeed side 16 (see FIG. 2) of the separator rail 9 runs slanted downwardly in the direction of conveyance.

Along the outer longitudinal sides of infeed conveyor 1 and intermediate conveyor 2, guide rails, not shown, are mounted to extend up to the discharge conveyor 3. Likewise, the discharge conveyor 3 and the subsequent recovery conveyor belt 4 are equipped with guide rails, not shown.

Now that the parts of the conveyor system have been identified, and the underlying principle of separating containers into staggered groups has been identified, the manner in which the system functions will now be described in greater detail. Assume that starting conditions prevail at the outset, an assemblage of eighteen bottles 14 in three rows of six bottles has been deposited on the infeed conveyor belts 1a, 1b and 1c by the unloader 5. This is done when at least the infeed conveyor belts 1a, 1b and 1c are brought to a momentary stop. During the ensuing conveyor stroke, the assemblage of bottles at the beginning of the infeed conveyor is advanced to the position within the region designated by Ta. At the moment, then, the eighteen bottles 14 will have been advanced out of the region at the beginning of the infeed conveyor so that region defined between stop 10 and rail 7 is devoid of bottles temporarily. The conveyor belts are running after the 18 bottles are loaded, however, so when the "A" group of six was transferred to the Ta region, the leading bottle in the group of six on conveyor belt 1a ran onto deadplate 6a and the leading bottle in the group was blocked by actuation of the blocking device depicted in FIG. 2. This means that the six bottles on belt 1a were precluded temporarily against advancing onto the intermediate conveyor belt 2a. Meanwhile, during what may be called two more conveyor strokes, the six bottles on infeed conveyor belt 1b advanced through the Ta region to the Tb region where the leading bottle in that group became locked on deadplate 6b. But, the group of six bottles on infeed belt 1c were advanced in three conveyor strokes to the region of Tc whereupon the leading bottle of that group remains blocked on deadplate 6c. Now, if no more bottles had been fed into the system, at this moment there would be the group of six bottles on infeed conveyor belt 1c in region Tc, another six staggered from the first six in the region Tb on infeed conveyor belt 1b and there would be another group of six bottles on conveyor belt 1a in region Ta. Realize that the infeed conveyor belts 1a, 1b and 1c and intermediate conveyor belts 2a, 2b and 2c are running, except when at least infeed conveyor belts 1a, 1b and 1c are stopped for one stroke to allow loading of the assemblage of containers on the infeed conveyor belts. When the groups of six leading bottles are blocked on the deadplates 6a, 6b and 6c, the blocked bottles behind them are standing still, but the conveyor belts are slipping under them.

Now, the staggered groups of six bottles can be unblocked to advance onto the intermediate conveyor belts 2a, 2b and 2c. As shown in FIG. 1, the group on infeed belt 1a has the greatest distance to go to get to the conversion region "U" where the group is identified by the letter A. The next group of six on infeed conveyor belt 1b, when unblocked, has had a one group lead on the group on belt 1a, so it arrives at the conversion area where the group is identified by the letter B before group A has arrived. Further, the group of six bottles on infeed conveyor belt 1c, when unblocked had a one timing period lead over the region Tb on infeed conveyor belt 1b so that the group on 1c identified by the letter C and has become the leading group of the outfeed conveyor. Of course, the group A stays in line with the conveyor 1a when that group is on intermediate group 2a. The group B had to be deflected from conveyor belt 2b onto belt 2a for being discharged from the conveyor system. Likewise, the group of six bottles on intermediate conveyor belt 2c had to be deflected from conveyor belt 2b in order to get on outfeed conveyor built 2a. The region where deflecting guide member 8 is positioned is designated as the conversion area and is marked with the letter U.

Discussing the way in which one complete assembly of eighteen bottles can become arranged as three staggered groups of bottles in series was given to clarify understanding as to how the system operated. However, it will be understood that the loading of successive assemblages of eighteen bottles on the infeed conveyor is repetitive, so outfeed of bottles in single file is continuous, Hence, the operating mode of the system must be elaborated as follows.

Concurrently with the three leading groups of six bottles becoming blocked in the Ta, Tb and Tc regions, another assemblage of eighteen bottles 14 is loaded onto the infeed conveyor belts 1a, 1b and 1c since the loading region is cleared. The three staggered groups of bottles are released to the intermediate conveyor at this moment. Thus, in the next conveyor stroke, the assemblage of eighteen bottles advances to the Ta region as depicted in FIG. 1. The group of six bottles on conveyor belt 1a are blocked on deadplate 6a. Groups of six bottles that were immediately trailing the leading and released groups on belts 1c and 1b now advance to leading position and are blocked. Concurrently with the groups advancing to leading positions, the region Tb on belt 1c becomes filled by advancement of the group in the region Ta on belt 1c. This clears region Ta on belt 1c. Simultaneously, the group of six bottles on conveyor belt 1b in region Ta were advancing to region Tb on belt 1b so the region Ta on belt 1b is cleared. The region Ta on belt 1a was cleared when the three staggered groups were released. During the next stroke of the conveyor, the group of eighteen replenished bottles on the infeed conveyor belts 1a, 1b and 1c are advanced to the region Ta for a repetition of the sequence. Also, at this moment, all of the lanes of the conveyor are unblocked and the three groups of six bottles advance to the intermediate conveyor belts 2a, 2b and 2c, respectively, as previously explained. It must be realized that the process is continuous although there are momentary stops of the infeed conveyor belts to allow for depositing a replacement group of eighteen bottles at the beginning of the infeed conveyor.

In a variation of the invention, the conveyor belts 2a, 2b and 2c of the intermediate conveyor 2 can link up with the conveyor belts 1a, 1b and 1c of the infeed conveyor. With this configuration, the deadplates 6a, 6b and 6c can be eliminated. However, short cross-over rails, not shown, must be installed to guide the designer glass containers from the conveyor belts of the infeed conveyor to the conveyor belts of the intermediate conveyor. Moreover, the guide surface 8 could start immediately after the cross over plate 6c without any space between them. In addition, the infeed conveyor could also be operated by the drive of the intermediate conveyor, when the motor M1 would be replaced by a clutch coupling.

The blocking devices 17 in FIG. 2 will now be discussed in more detail. The purpose of the blocking operation is to assure that the groups of six bottles, in this example, are correctly positioned relative to each other to yield a series of bottles on the outfeed conveyor that is not jammed nor does it have any gaps in it. Each blocking device has a plunger 18 which is perpendicular to the conveyor plane and can be raised and lowered. The plunger is attached to the piston rod of a controllable pneumatic cylinder 19. The control of the blocking devices 17 is achieved in connection with the drive of infeed conveyor 1, that is, when the drive of the infeed conveyor 1 is activated to transfer the glass containers 14 to the intermediate conveyor 2, the plungers are simultaneously raised to release the axial clamping force on the containers that stand on the deadplates 6. As soon as the container group transfer to the intermediate conveyor is completed, the plungers 18 are lowered whereby the glass containers that are standing on the deadplates are already clamped down and held in position. The blocking process can be introduced each time the last container of the groups A, B and C has reached the deadplate and the drive of the infeed conveyor 1 is stopped. An uncontrolled, untimely container transfer due to such things as vibrations of the deadplates can thereby be avoided reliably.

I claim:

1. A method of converting a plurality of parallel rows of containers into a single file stream, comprising:
   depositing on adjacent parallel infeed conveyors a group of parallel rows of containers with one row on each conveyor,
   conveying on the infeed conveyor one of the rows initially through a distance substantially equal to the length of said row and conveying successively adjacent rows through distances, respectively equal to increasing multiples of the length of a row to arrange the rows in series and in straight lines and parallel and successively staggered relative to each other with said one of the rows being the last row in the series and another of the rows being the first row in the series in the direction of conveyance with at least one row being intermediate said first and last rows in the series,
   continuing conveyance of the rows to a conversion region while maintaining the containers in each row in a straight line for said first row and intermediate row or rows to remain in order and in staggered relation to impact in the stated order a deflector angulated to the direction of conveyance for shifting the staggered rows of containers into a single file stream with said one row.

2. The method according to claim 1 wherein:
   the parallel rows of predetermined numbers of containers are deposited in a first position on an infeed conveyor having a plurality of parallel translatable belts, said depositing being accomplished when said belts are not translating for a short time interval,
   translating all of the parallel rows of containers from said first position to a second position to clear said first position for receiving another group of equal numbers of containers, and then
   moving the groups of predetermined numbers of containers out of said second position over said distances, respectively, and arranging the rows in staggered fashion when they are moved.

3. The method according to claim 1 including depositing said groups of rows of containers at a first position on parallel translatable belts of an infeed conveyor with the rows in parallel on the respective belts, and
   advancing all of the parallel rows of containers simultaneously such that the leading ends of the individual container rows are staggered in steps in the direction of the conversion region.

4. The method according to claim 1 wherein the length of any one of the container rows that is delivered to the conversion region corresponds to the length of the offset between two adjacent container rows.

5. The method according to claim 3 wherein the length of any one of the container rows which is delivered to the conversion region corresponds to the lengthwise distance between adjacent parallel container rows.

6. The method according to any one of claims 2, 3, 4 or 5 wherein the conversion region is comprised of conveyor belts arranged for receiving the staggered rows, respectively, in succession,
   translating the conveyor belts in the conversion region continuously, and providing a container discharge conveyor belt for receiving the series arranged container rows from the conversion region, the conveyor discharge conveyor belt translating at the same speed as the conveyor belts in the conversion region.

7. The method according to claim 6 including translating said conveyor belts in the conversion region slightly faster than the discharge conveyor belt is being translated for closing any gaps between groups of containers.

8. A method of converting rows of containers that are abreast of each other into a single file stream comprising the steps of:
   loading simultaneously groups of parallel rows of containers having equal numbers of containers in the rows onto parallel translatable belts, respectively, of an infeed conveyor at a first position of the conveyor, conveying all of the rows of containers together longitudinally through a distance at least as great as the equal length of a row for arrival of the rows at a second position on the infeed conveyor such as to clear the first position of containers, blocking the leading end of an outermost row of containers among the rows in said second position on the belt supporting the outermost row and then conveying one row after another beginning with the row adjacent the outermost row successively through distances equal to at least the length of each row and multiples thereof during ensuing translation of the conveyor until the container rows are blocked at their leading ends and are arranged in series but are offset in parallel with each other, concurrently with the last of the rows becoming blocked, stopping the infeed conveyor for reloading it and then unblocking the rows and restarting the infeed conveyor to transfer the rows in series to corresponding aligned belts of an intermediate conveyor during successive movement of the infeed conveyor such that during a movement of the conveyor when said outermost row exits said first position the reloaded rows are conveyed to said second position to repeat the cycle, said intermediate conveyor belts conducting said offset groups to a conversion region after the groups are unblocked, and shifting the groups that are offset from said outermost group laterally in the conversion region to effect arrangement of the rows of containers in single file.

9. The method according to claim 8 including using the conveyor belt of the intermediate conveyor which carries said outermost row of containers as the outfeed conveyor belt on which the rows are formed in single file, and directing the single file series of containers onto a collection belt.

10. The method according to any one of claims 8 or 9 wherein the intermediate conveyor belts are running continuously.

11. Apparatus for converting multiple parallel rows of containers into a single file stream comprising:

a plurality of translatable infeed conveyor belts for receiving groups of rows of containers arranged in parallel on the respective infeed conveyor belts, said belts being translatable over intervals designated as strokes, said rows of containers being conveyed upon occurrence of a succession of strokes to positions wherein the rows are arranged in series but are successively offset from each other, an intermediate conveyor comprised of translatable parallel belts aligned with and proximate to the infeed conveyor belts for receiving the successively offset rows of containers and transporting the rows to a conversion region, means in the conversion region for shifting laterally the rows of containers that are offset relative to one row into series with said one row to form a single file stream of containers.

12. The apparatus according to claim 11 wherein the conveyor belt of the intermediate conveyor that transports said one row of containers is the belt on which the single file stream of containers is formed, and a recovery conveyor belt to which the single file stream of containers is transported from one said belt.

13. The apparatus according to claim 11 wherein said means for shifting said rows of containers in the conversion region of the intermediate conveyor comprises a guide surface angulated transversely of the belts transporting the offset rows of containers for diverting said offset rows into single file arrangement with the one row.

14. The apparatus according to claim 11 wherein:

the parallel adjacent assembly of belts of the infeed conveyor have different lengths, a belt on one side of the assembly having the shortest length and a belt positioned laterally across the assembly having the greatest length, the shortest belt being at least long enough to accommodate at one time at least one of the rows of containers that is designated the trailing row when the rows are offset and the longest belt being long enough to accommodate several rows at one time with the most advanced row thereon being designated the leading row, one or more belts between said shortest and longest belts increasing in length relative to said shortest belt for accommodating on each of them a succession of one row increases in the number of rows up to the number of rows that can be accommodated on the longest belt.

15. The apparatus according to claim 14 including:

a blocking device arranged coincident with the ends of the respective infeed conveyor belts operative to block the row of containers against further conveyance until all of the infeed conveyor belts have a row of containers conveyed to the end of the belts in correlation with said strokes, to provide assurance that when said rows are unblocked simultaneously they are properly spaced in the direction of conveyance for being arranged in single file.

16. The apparatus according to claim 15 wherein there is a deadplate at the end of each conveyor belt of the infeed conveyor intervening between the respective infeed and corresponding intermediate conveyor belts, said blocking device comprising a plunger and means for driving a plunger into engagement with the container at the leading end of each group when the leading containers arrive on said deadplates.

17. The apparatus according to any one of claims 15 or 16 wherein the belts of the intermediate conveyor are of different lengths, the intermediate conveyor belt having the greatest length among the intermediate conveyor belts being aligned with the infeed conveyor belt having the shortest length among the infeed conveyor belts, and the intermediate conveyor belt having the shortest length among the intermediate conveyor belts being aligned with the infeed conveyor belt having the greatest length.

18. The apparatus according to any one of claims 11, 12, 13, 14 and 15 including means for translating said intermediate conveyor belts continuously.

19. The apparatus according to claim 17 including means for translating said intermediate conveyor belts continuously.

20. The apparatus according to claim 12 including means on which said recovery belt is translated independently of the intermediate conveyor belts.

21. The apparatus according to claim 11 including a reloader device operative to deposit a group of rows of containers each containing an equal number of containers on each infeed conveyor belt during a stationary phase of the infeed conveyor belts between consecutive conveyor strokes.

22. The apparatus according to claim 21 wherein said reloader device has means for transporting the rows of containers in a direction that is perpendicular to the direction in which the infeed conveyor belts translate.

23. The apparatus according to any one of claims 11, 12, 13, 14, 15, 16, 20, 21 and 22 including a stop rail (10) that is reciprocable perpendicular to said infeed conveyor belts concurrently with deposit of said container rows by the reloader for stabilizing the containers during reloading.

24. Apparatus according to claim 11 including separator rails (9) mounted above and between the respective infeed conveyor belts, said rails extending along the infeed conveyor belts up to the corresponding intermediate conveyor belts.

25. The apparatus according to claim 24 wherein the beginnings of the separator rails (9) reckoned in the direction of the conveyance are slanted downwardly in the direction of conveyance.

* * * * *